United States Patent [19]

Schwanda et al.

[11] Patent Number: 5,635,785

[45] Date of Patent: Jun. 3, 1997

[54] ROTOR OF AN ELECTRIC MACHINE WITH WINDING OVERHANG SUPPORT

[75] Inventors: Josef Schwanda, Lupfig; Hans Vögele, Leibstadt, both of Switzerland

[73] Assignee: Asea Brown Boveri AG, Baden, Switzerland

[21] Appl. No.: 601,509

[22] Filed: Feb. 14, 1996

[30] Foreign Application Priority Data

Apr. 8, 1995 [DE] Germany ............... 195 13 457.5

[51] Int. Cl.$^6$ .................................................. H02K 1/28
[52] U.S. Cl. .......................... 310/270; 310/260; 310/261; 336/197
[58] Field of Search ................................ 310/270, 261, 310/260; 336/197

[56] References Cited

U.S. PATENT DOCUMENTS

| | | | |
|---|---|---|---|
| 2,519,219 | 8/1950 | Baudry et al. | 310/270 |
| 3,831,050 | 8/1974 | Laskaris | 310/270 |
| 4,912,354 | 3/1990 | Frank | 310/271 |
| 5,068,564 | 11/1991 | Frank | 310/270 |

FOREIGN PATENT DOCUMENTS

1178143  9/1964  Germany .
127214   1/1995  Germany .

*Primary Examiner*—Steven L. Stephan
*Assistant Examiner*—Nguyen Tran N.
*Attorney, Agent, or Firm*—Oblon, Spivak, McClelland, Maier & Neustadt, P.C.

[57] ABSTRACT

In the rotor of an electric machine, in particular a motor-generator set for pumped storage units, the rotor body (6), which is constructed from laminated metal sheets, is held together by axially extending clamping bolts (8). The rotor winding (16) is inserted in slots on the outer circumference of the rotor body and held there against the effect of centrifugal force. The winding ends (16a), which emerge axially from the rotor body and form the winding overhang (17), are secured against the effect of centrifugal force by radially extending stud bolts (37) which are screwed into a support ring arrangement (19, . . . , 24). The support ring arrangement comprises a plurality of rings (19, . . . , 24) spaced apart in the axial direction. The rings in the section near the axis of the rotor body are clamped together together with the press fingers (30) by means of the tension bolt (8) axially penetrating the rotor body. Provided in the section further from the axis are further tension bolts (25, 26, 27) which axially penetrate only the said ring arrangement and clamp the rings together axially.

17 Claims, 7 Drawing Sheets

FIG. 8

ROTOR OF AN ELECTRIC MACHINE WITH WINDING OVERHANG SUPPORT

BACKGROUND OF THE INVENTION

1. Field of the Invention

The invention relates to a rotor of an electric machine, in particular a motor-generator set for pumped storage units, having a rotor body which is arranged on a hub, secured in the axial direction and in the circumferential direction, is constructed from laminated metal sheets and is held together by axially extending clamping bolts, having slots on the outer circumference of the rotor body into which a rotor winding is inserted and held there against the effect of centrifugal force, the winding ends, which emerge axially from the rotor body and form the winding overhang, being secured against the effect of centrifugal force by supporting means having a support ring which is at the same time a thrust plate for the rotor body.

The invention proceeds in this case from a prior art such as, for example, from the book by Wiedemann/Kellenberger "Konstruktion elektrischer Maschinen" ["Designing electric machines"], Springer-Verlag Berlin, Heidelberg, N.Y. 1967, pages 377 to 380, in particular FIG. 375 on page 378.

2. Discussion of Background

For operating reasons, (optimum efficiency, load regulation in pumping operation, power system stability), there is a growing need for variable-speed motor-generator sets, principally for pumped storage units. For reasons of cost, such machines are mostly designed as a double-feed slipring rotor asynchronous machine.

In the case of such machines, the rotor and, in particular there, its rotor winding overhang, are exposed to extreme mechanical and thermal loads. In asynchronous machines, the winding overhangs are usually supported against centrifugal forces by means of bandages made from pretensioned steel wire in combination with a solid single-piece steel ring which is at the same time a thrust ring for the laminated rotor (compare loc. cit., FIG. 375a on page 378). The limits of this design are set by the expensive installations aids and the transport dimensions and by the weight limitation of the rotor. In the case of rotors for hydroelectric machines of large dimensions, it must be possible to form the assembly directly on an installation site in the power station. Moreover, large solid steel rings impair the throughflow of the winding over-hang and thus the cooling thereof.

SUMMARY OF THE INVENTION

It is the object of the invention to provide a rotor of an electric machine, in particular a motor-generator set for pumped storage units, which is easy to produce without expensive installation aids, and which has a supporting system for the winding overhangs which withstands all the operating loads and also does not limit the cooling of the winding overhangs.

This object is achieved according to the invention when press fingers are arranged on the end plates on the rotor body, when the support ring comprises at least two rings which are spaced apart in the axial direction and are supported at their inner circumference on the hub, the rings being clamped together in the section of the rotor body near the axis together with the press fingers by means of the first tension bolt axially penetrating the rotor body, when there are provided in the section further from the axis second tension bolts which axially penetrate only the said rings and clamp the rings together axially, and when there are provided third tension bolts, which radially penetrate the winding overhang and act at least on the outer circumference of the outer ring from an axial point of view.

According to a first development of the subject-matter of the invention, there are provided on the outer circumference of all the rings a multiplicity of axially extending, mutually aligned, half-closed slots which are distributed in the circumferential direction and into which a straight edge provided with radially extending threaded bores is pushed in each case, into which threaded bores the said third tension bolts are screwed. This yields a radial supporting system which is simple to produce and reliable.

It is advantageous for the ring immediately adjacent to the press fingers to be distanced from the latter, and for the second tension bolts to have at the end on the rotor-body side bolt nuts whose height corresponds to the said distance. In this way, there is additionally exerted on the press fingers a squeezing pressure which can be further improved when, as seen in the radial direction, at least two second tension bolts are provided and the height of the nuts is smaller in the section near the axis than in the section further from the axis. In this way, the ring arrangement is inverted during pretensioning. The inversion force acts as a squeezing force on the press fingers and on the centroid of the rotor ring.

It may prove in some circumstances that the ring arrangement inherently has too small (effective) a cross section to act alone as a pretensioning element. A development of the invention therefore provides for the purpose of additional tensioning in the section further from the axis fourth tension bolts which axially penetrate both the rings and the rotor body but not the press fingers, which fourth tension bolts are electrically insulated from the rotor body and also from the rings.

It is advantageous in a similar way for the ring arrangement to be fixed like the rotor body axially on the hub and in the circumferential direction.

The rotor body and the support ring arrangement are dimensioned such that in operation both expand radially in a uniform fashion. Any small differential expansions occurring between the rotor ring and the ring arrangement can advantageously be absorbed by inserting corrugated springs made from insulating material, which are inserted into the slot bottom of the rotor winding.

BRIEF DESCRIPTION OF THE DRAWINGS

A more complete appreciation of the invention and many of the attendant advantages thereof will be readily obtained as the same becomes better understood by reference to the following detailed description when considered in connection with accompanying drawings or wherein exemplary embodiments of the invention are represented diagrammatically, specifically.

DESCRIPTION OF PREFERRED EMBODIMENTS

Figure 1A:
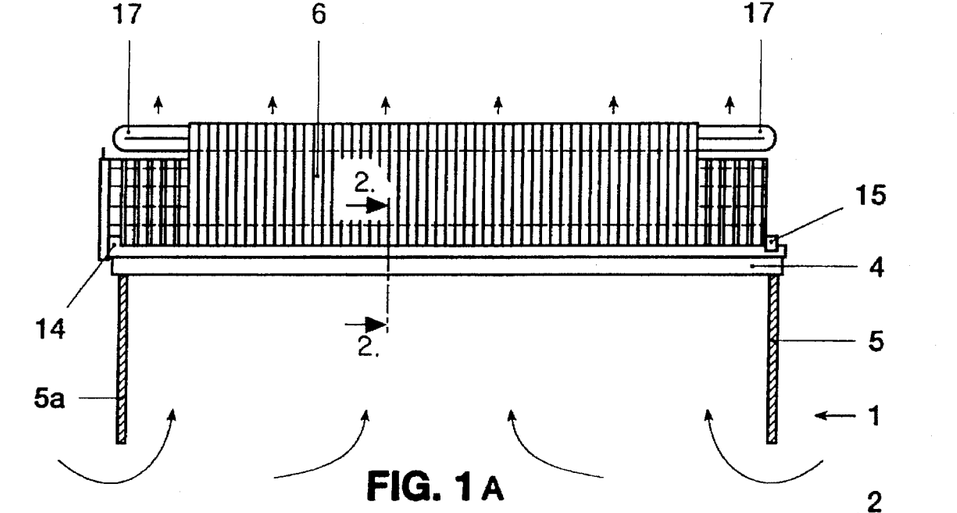
FIG. 1 shows a simplified longitudinal section through the rotor of a motor-generator set.
Figure 1B:
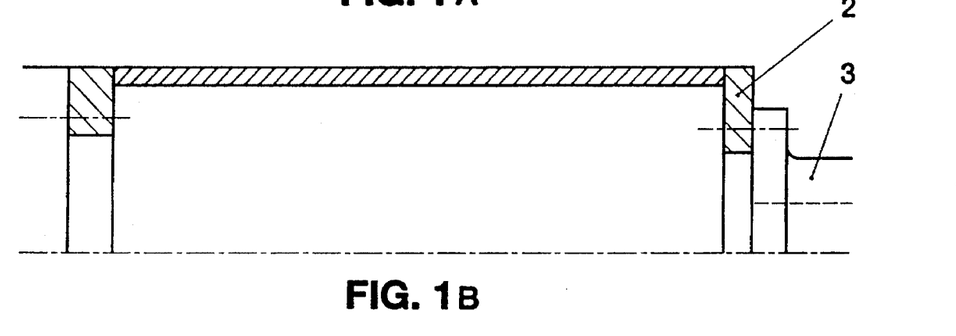
Figure 4:
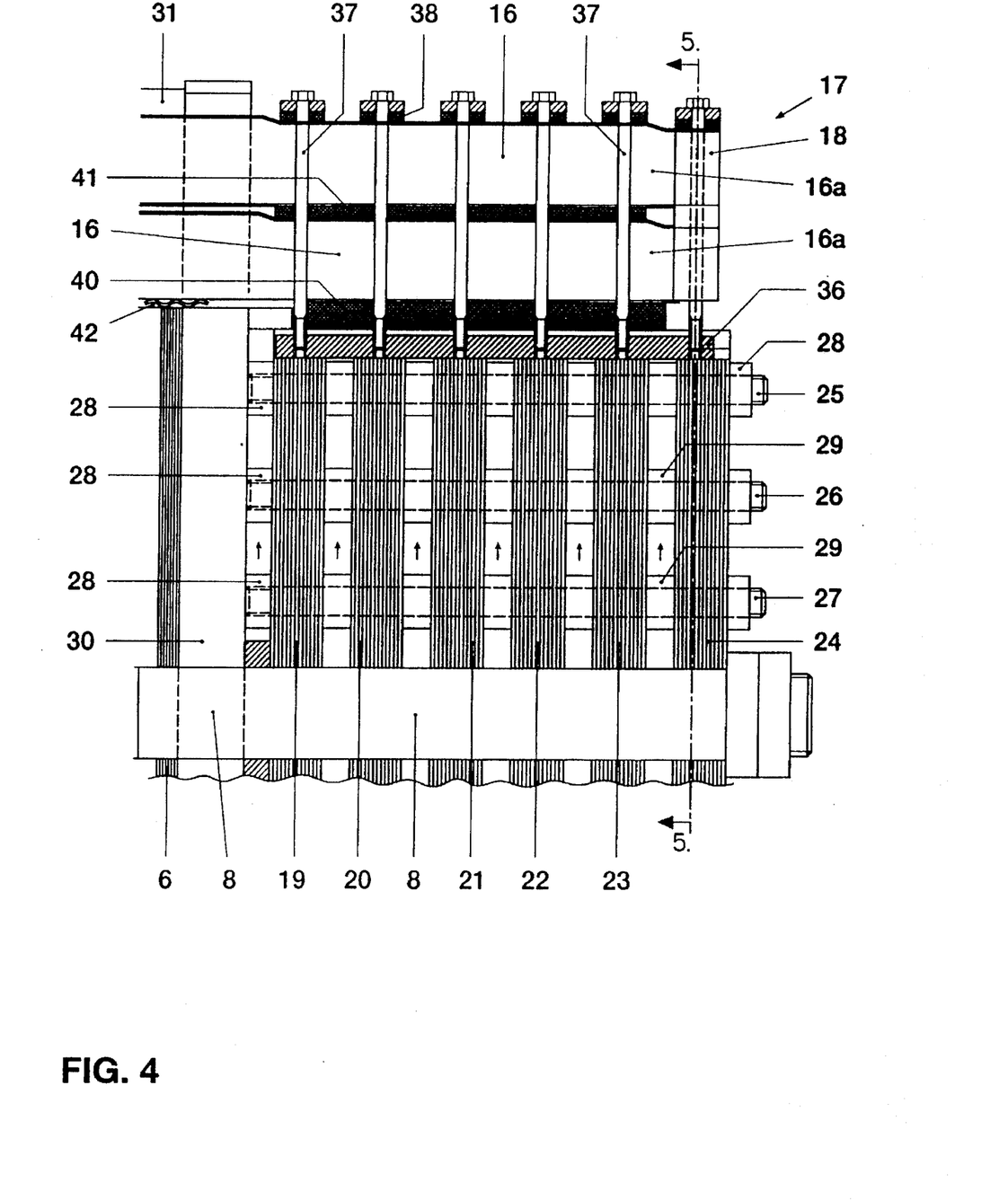
FIG. 4 shows a longitudinal section through the right-hand rotor end of the machine according to FIG. 1, on an enlarged scale.

Referring now to the drawings, wherein like reference numerals designate identical or corresponding parts throughout the several views, in FIG. 1 of the drawing the rotor of a motor-generator set is represented in a highly diagrammatic form. It comprises a rotor hub 1 having an inner hub part 2 onto which the shaft 3 of a hydraulic turbine (not represented) is flanged, and an outer hub part which comprises a multiplicity of beams uniformly distributed over the circumference, and is denoted as the hub 4 below for the sake of simplicity. The two hub parts are interconnected by means of arms 5, preferably inclined arms, which are covered by cover plates 5a at the ends. This cover plate does not reach as far as the inner hub part. During operating of the machine, owing to the effect of ventilation air is sucked from outside into the space between the inclined arms 5 and cover plates 5a and flows through the rotor body 6 fastened to the outer circumference of the hub 4. Said rotor body comprises segmented metal sheets 7 which are pressed together by the means of tension bolts (compare, for example, FIG. 4, position 8) penetrating the rotor body 6. The rotor body 6 is subdivided in this arrangement into axially separated laminated cores (merely indicated in FIG. 1) which leave free between them radial cooling slits through which the cooling air can flow to the outside into the machine air gap.

Figure 2:
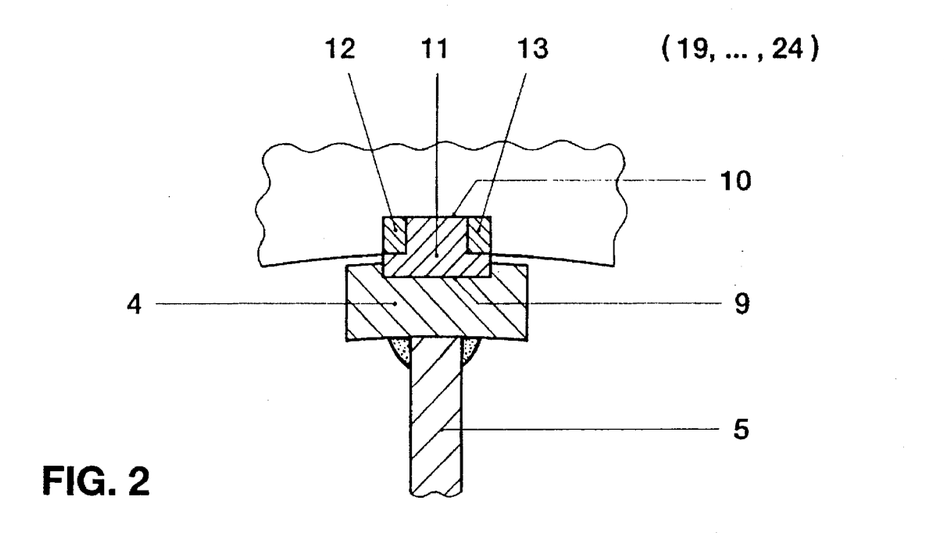
FIG. 2 a cross section through the connecting point of the hub and rotor body of the machine according to FIG. 1 along the line AA therein.
Figure 3:
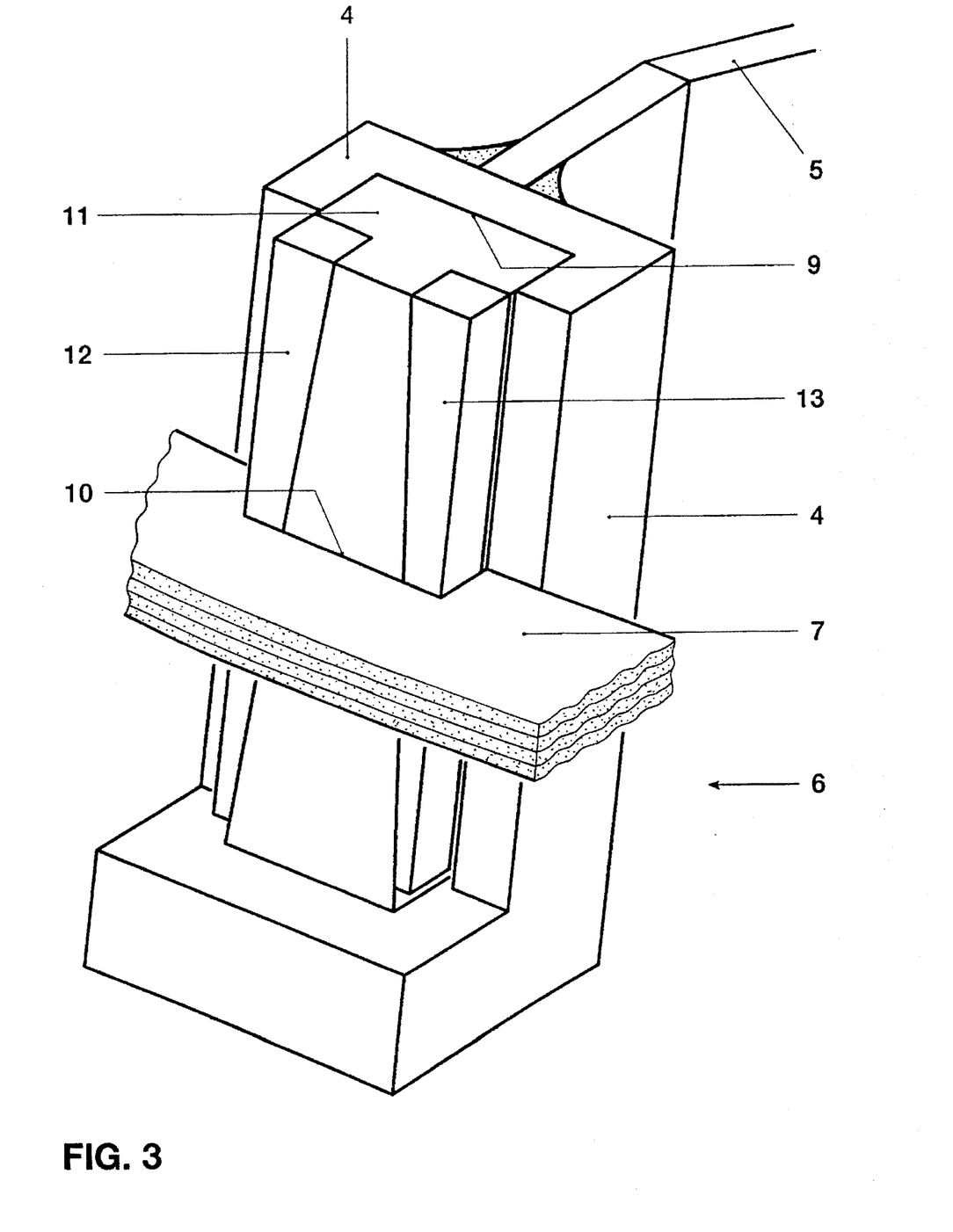
FIG. 3 shows a perspective representation of the connecting point in accordance with FIG. 2.

The rotor body 6 is fastened on the hub 4 in a known way via a key arrangement such as is illustrated in FIGS. 2 and 3. Provided outside on the hub 4 are first axially extending slots 9 which have a rectangular cross section and are situated opposite second slots 10, likewise with a rectangular cross section, on the inner circumference of the rotor body 6. A key 11 having a T-shaped cross section is inserted into the first slots. Drive-fitted keys 12, 13, which in the driven-in state complement the key 11 to form a cuboid, are used to fix the rotor body 6 on the hub 4 in the circumferential direction. Owing to the rectangular shape of the key arrangement, it is ensured that radial relative movements—be they induced by temperature and/or centrifugal force—are possible between the hub 4 and rotor body 6. Fixing the rotor body 6 on the hub 4 is performed at one hub end by a shoulder 14, and at the other hub end by axially secured heel plates 15 which are suspended on the outer circumference of the hub 4 and distributed over the circumference of the hub 4.

Figure 6:
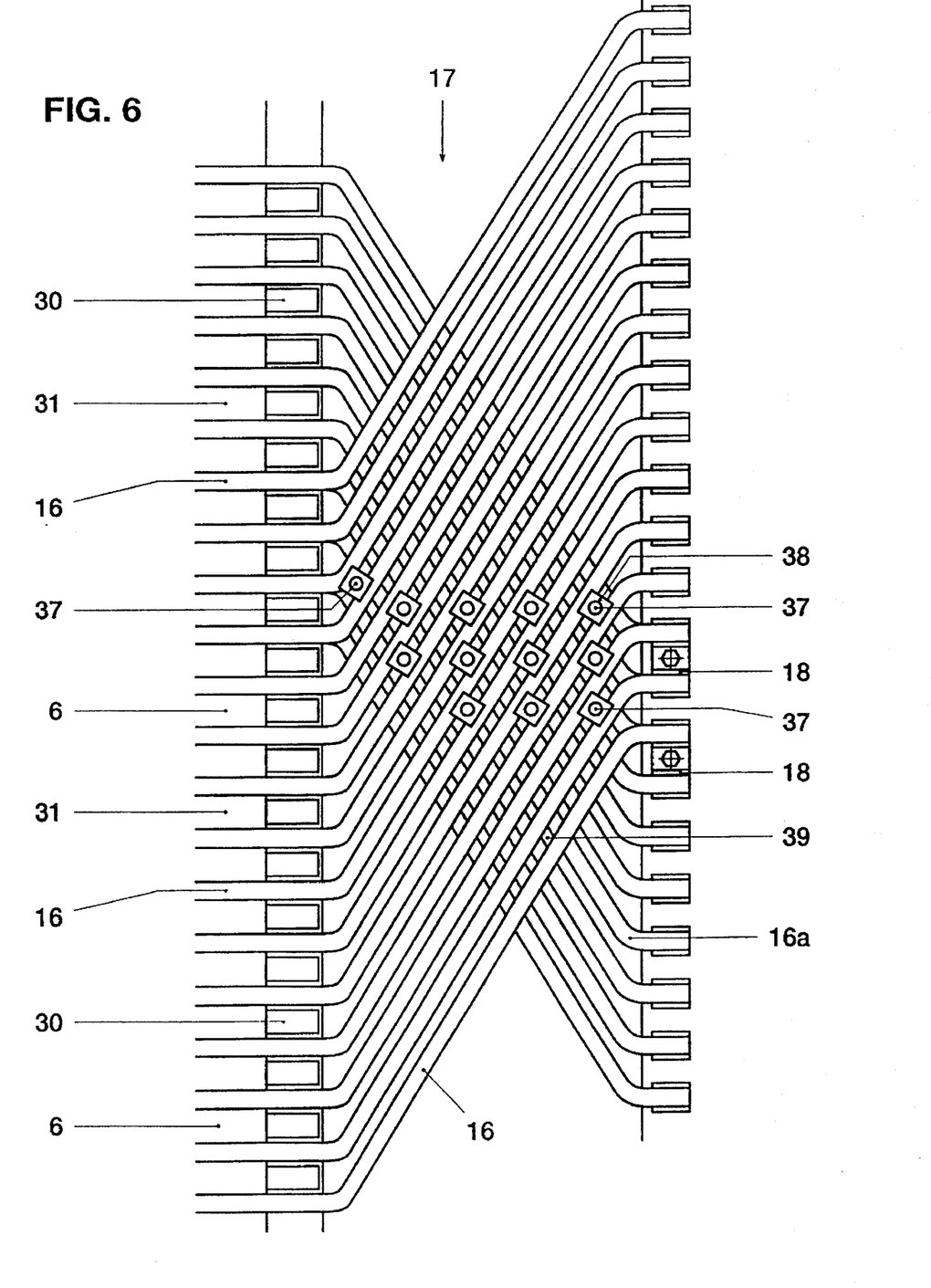
FIG. 6 shows a plan view of the winding overhang of the machine.

The rotor winding 16, which is double-layered in the exemplary embodiment, is arranged in slots on the outer circumference of the rotor body 6 and held therein by means of slot keys. The winding ends 16a, which emerge axially from the rotor body and form the winding overhang 17, are connected electrically and mechanically in a known way by means of eyes 18, an eye 18 connecting the conductor end of a conductor, emerging from a slot, of the lower layer to the conductor end of a conductor, emerging from a distance slot, of the upper layer (compare FIG. 6). This design and electrical interconnection in the winding overhang are likewise to be considered as prior art and are not the subject-matter of the invention.

As shown by a glance at the winding head 17 (represented only partly), it is mandatory to support the winding overhang against the effects of centrifugal force. Since—as has already been explained in the introduction—bandages in combination with solid support rings which at the same time take over the function of a thrust plate do not come into question, the invention now provides to achieve the support by means of a ring arrangement which comprises a plurality of separate rings 19 to 24 and is denoted below as a retaining ring. The rings 25 to 27 are composed of 2 to 6 mm thick segmental laminations in a manner of the rotor body. The segmental laminations of a layer are offset in this arrangement with respect to the segments of the neighboring layer in the circumferential direction. The rings, of which there are six in the exemplary embodiment, are pressed to form a homogeneous retaining ring by means of pretensioned tension bolts 25, 26, 27 and nuts 28. As follows from FIG. 5, the tension bolts 25–27 are uniformly distributed in the circumferential direction. Spacing is ensured by spacers 29 in the form of tube lengths between the rings 19 and 20, 20 and 21, 21 and 22, 22 and 23, and 23 and 24. Instead of spacing tubes, it is also possible to use a radially extending spacing plate which is penetrated by the three tension bolts 25 to 27. Cooling air can in this way flow from the hub to the winding overhang 17.

The retaining ring is pushed as a whole onto the hub 4 and fixed in the same way on the hub 4 in the circumferential direction and in the axial direction, as was described in connection with the fastening of the rotor body 6 with the aid of FIGS. 2 and 3.

In order for the retaining ring now to be able to fulfill its first function (pressing the rotor body 6), radially extending press fingers 30 are arranged on the end face of the last metal sheet of the rotor body 6, for example welded to said sheet. These press fingers 30 pass through in the region of the rotor body remote from the axis between the neighboring winding conductors 16 almost as far as the outer end of the slot teeth 31. In the section closer to the axis, they end just in front of the tension bolts 8, or pass between the latter as far as the hub (compare FIG. 5). The tension bolts 8 penetrating the entire rotor body 6 now press the retaining ring against the press fingers 30 and thus also against the rotor body 6. The contact pressure in the region near the axis is fully sufficient for this purpose.

Figure 5:
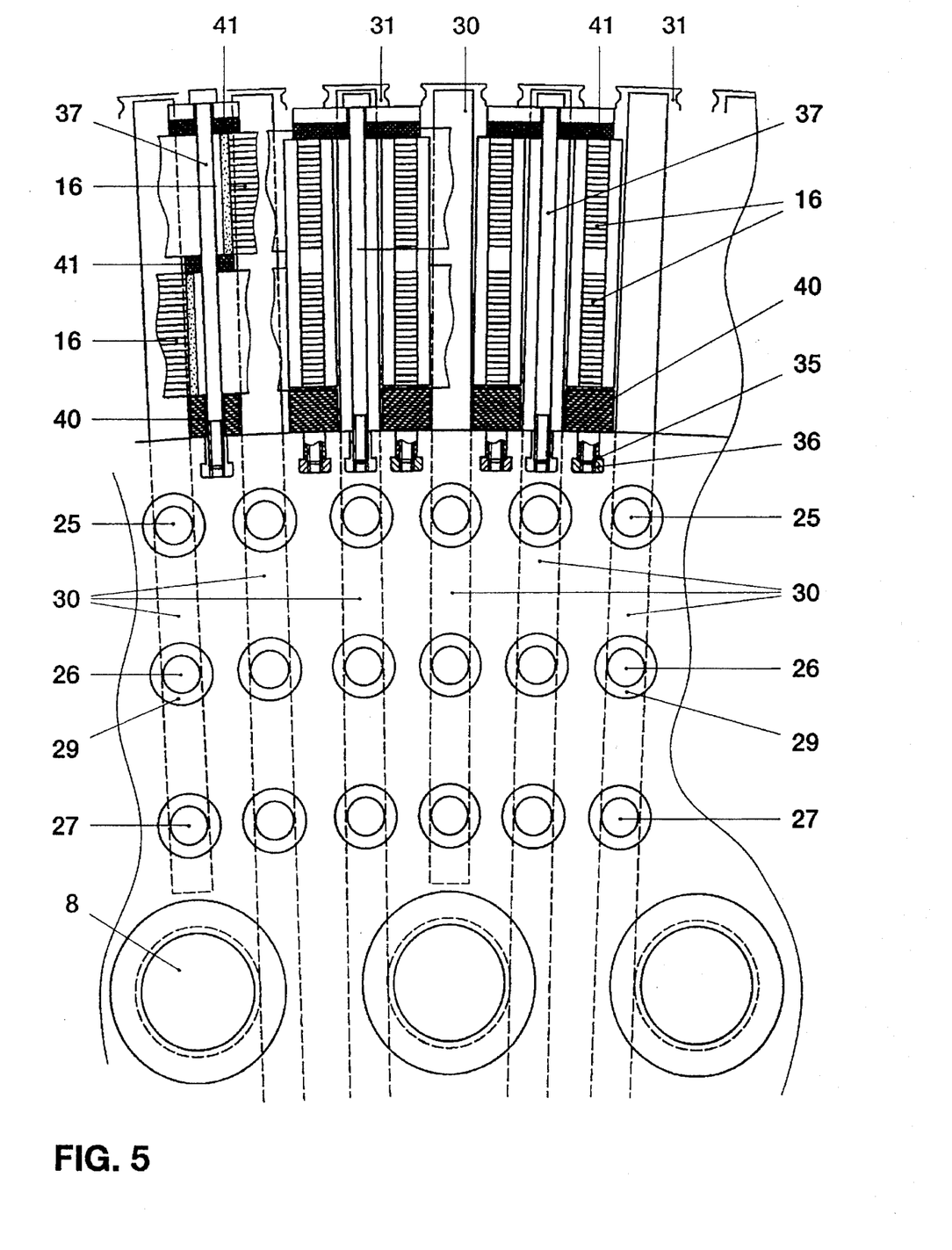
FIG. 5 shows a cross section through the winding overhang, and the associated supporting system in accordance with FIG. 4 along the line BB therein.

In order to ensure that even in the region further from the axis, that is to say in the region of the tension bolts 26 and, above all, the tension bolt 25 situated furthest to the outside radially a sufficient squeezing force can act on the rotor body 6, a development of the invention provides to dimension the height of the nuts 28, situated at different radial levels, of the tension bolts 25, 26 and 27 such that the nuts situated on the outside radially are higher than the nuts situated on the inside radially or, in the case of the use of nuts of the same height, to use different shims (not represented explicitly in FIG. 5). The retaining ring is clamped together with the tension bolts 25 to 27 in a defined fashion. During clamping with the tension bolts 8, it experiences inversion. The inversion force acts as a squeezing force on the press fingers 30 and on the centroid of the rotor body.

Figure 7:
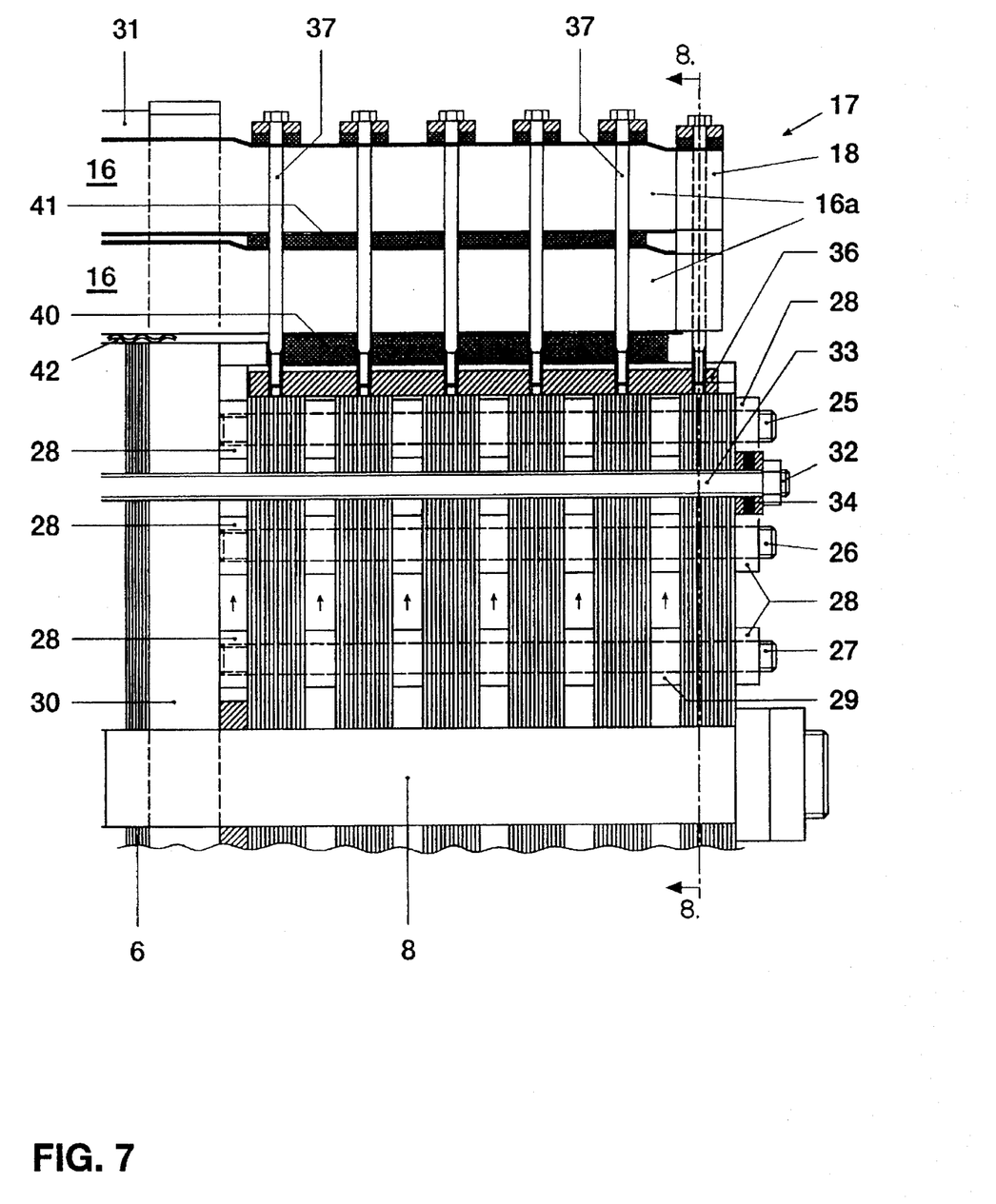
FIG. 7 shows a longitudinal section through the right-hand rotor end in a way analogous to FIG. 4, with an additional insulated tension bolt in the section further from the axis.
Figure 8:
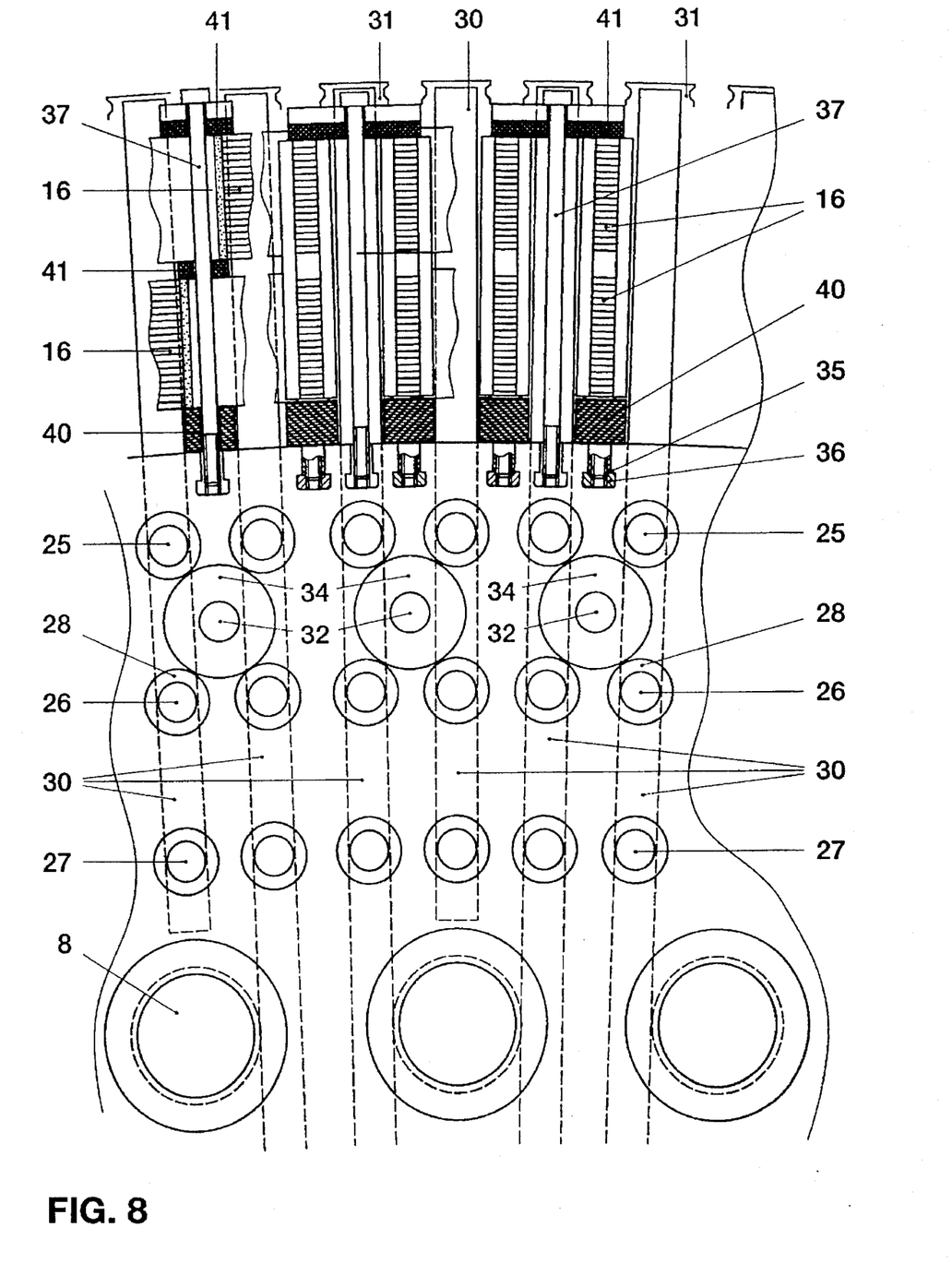
FIG. 8 shows a cross section through the winding overhang and the associated supporting system in accordance with FIG. 7 along the line CC therein.

Should it emerge that the retaining ring is able to exert only a little squeezing force on the press finger sections situated further out radially, for example if it has too small an effective cross section, in accordance with FIGS. 7 and 8 it is possible to provide additional tension bolts 32. The latter penetrate the two retaining rings, that is to say all six rings 19, . . . , 24 and the rotor body, but not the press fingers 30. These additional tension bolts 32 are provided over the entire bolt shaft with an insulation 33, and screwing into the end faces of the retaining ring is also performed with the interposition of insulating disks 34. Otherwise, the structure corresponds to that according to FIGS. 4 and 5.

In addition to its function as a press ring or thrust plate for the rotor body, as the ring arrangement comprising rings 19, . . . , 24 spaced apart, the retaining ring fulfills the function of the winding overhang supporting system. Provided for this purpose on the outer circumference of all the rings 19, . . . , 24 and distributed uniformly over their circumference are half-closed T-slots 35 which are aligned axially with one another. Threaded straight edges 36 are inserted into these slots 35. The threaded bores are situated in this case in the region of the rings 19, . . . , 24. Screwed into the threaded bores of the threaded straight edges 36 from the outside radially are stud bolts 37 with insulating shims 38, which penetrate the winding overhang 17. The arrangement and distribution of these stud bolts 37 is best seen from FIG. 4 in conjunction with FIG. 6, which is a simplified representation of a development of the winding overhang 17. It may be seen from FIG. 6 that these stud bolts 37 penetrate the rhomboid openings 39, caused by the winding structure, in the winding overhang 17. They can, but need not, be provded with an insulation in the shaft part. Interlayers 40 and 41 made from insulating material, for example glass fiber reinforced plastic, between the threaded straight edges 36 and the lower winding conductors, or between the lower and upper winding conductors, permit a uniform pressure distribution on the winding conductors 16 and defined clamping of the winding overhang 17 with the ring arrangement 19, . . . , 24 which withstands all operating loads without the cooling air flow through the winding overhang 17 being appreciably impaired.

The rotor body 6 and the retaining ring 19, . . . , 24 are dimensioned such that both expand uniformly in a radial fashion. Any small differential expansions occurring between the rotor body 6 and the retaining ring can be absorbed by spring means made from insulating material, for example corrugated springs 42 made from glass fiber reinforced plastic, which are inserted into the slot bottom of the winding 16.

Obviously, numerous modifications and variations of the present invention are possible in light of the above teachings. It is therefore to be understood that within the scope of the appended claims, the invention may be practiced otherwise then as specifically described herein.

What is new and desired to be secured by letters patent of the United States is:

1. A rotor of an electric machine, in particular a motor-generator set for pumped storage units, having a rotor body which is arranged on a hub, is constructed from laminated metal sheets and is held together by axially extending clamping bolts, having slots on the outer circumference of the rotor body into which a rotor winding is inserted and held there against the effect of centrifugal force, the winding ends, which emerge axially from the rotor body and form the winding overhang, being secured against the effect of centrifugal force by supporting means having a support ring which is at the same time a thrust plate for the rotor body, wherein press fingers are arranged on the end face of the last metal sheet of the rotor body, wherein the support ring comprises at least two rings which are spaced apart in the axial direction and are supported at their inner circumference on the hub, the rings being clamped together in the section of the rotor body near an axis together with the press fingers by means of a first tension bolt axially penetrating the rotor body, wherein there are provided in the section further from the axis second tension bolts which axially penetrate only the said rings and clamp the rings together axially, wherein there are provided third tension bolts, which radially penetrate the winding overhang and act at least on the outer circumference of the outer ring, from an axial point of view, and wherein there are provided on the outer circumference of all the rings a multiplicity of axially extending, mutually aligned, half-closed slots which are distributed in the circumferential direction and into which a straight edge provided with radially extending threaded bores is pushed in each case, into which threaded bores the said third tension bolts are screwed.

2. The rotor as claimed in claim 1, wherein the ring immediately adjacent to the press fingers is distanced from the latter, and this distance is filled up at points by a spacer, the spacer preferably being provided as the bolt nuts which are assigned to the second tension bolts at the end on the rotor-body side and whose height corresponds to the said distance.

3. The rotor as claimed in claim 2, wherein seen in the radial direction at least two second tension bolts are provided, and wherein for the purpose of achieving pretensioning the height of the spacers, preferably that of the nuts, is smaller in the section near the axis than in the section further from the axis.

4. The rotor as claimed in claim 2, wherein for the purpose of additional tensioning there are provided in the section further from the axis fourth tension bolts which axially penetrate both the rings and the rotor body but not the press fingers which fourth tension bolts are electrically insulated from the rotor body and also from the rings.

5. The rotor as claimed in claim 1, wherein the rings are secured on the hub in the axial direction and in the circumferential direction.

6. The rotor as claimed in claim 1, wherein spring means made from insulating material are inserted between the rotor winding and slot bottom.

7. The rotor as claimed in claim 1, wherein the ring immediately adjacent to the press fingers is distanced from the latter, and this distance is filled up at points by a spacer, the spacer preferably being provided as the bolt nuts which are assigned to the second tension bolts at the end on the rotor-body side and whose height corresponds to the said distance.

8. The rotor as claimed in claim 3, wherein for the purpose of additional tensioning there are provided in the section further from the axis fourth tension bolts which axially penetrate both the rings and the rotor body but not the press fingers, which fourth tension bolts are electrically insulated from the rotor body and also from the rings.

9. The rotor as claimed in claim 1, wherein the rings are secured on the hub in the axial direction and in the circumferential direction.

10. The rotor as claimed in claim 2, wherein the rings are secured on the hub in the axial direction and in the circumferential direction.

11. The rotor as claimed in claim 3, wherein the rings are secured on the hub in the axial direction and in the circumferential direction.

12. The rotor as claimed in claim 4, wherein the rings are secured on the hub in the axial direction and in the circumferential direction.

13. The rotor as claimed in claim 1, wherein the spring means made from insulating material are inserted between the rotor winding and slot bottom.

14. The rotor as claimed in claim 2, wherein the spring means made from insulating material are inserted between the rotor winding and slot bottom.

15. The rotor as claimed in claim 3, wherein the spring means made from insulating material are inserted between the rotor winding and slot bottom.

16. The rotor as claimed in claim 4, wherein the spring means made from insulating material are inserted between the rotor winding and slot bottom.

17. The rotor as claimed in claim 5, wherein the spring means made from insulating material are inserted between the rotor winding and slot bottom.

* * * * *